P. Clark,
Pipe Coupling.
No. 106,122.   Patented Aug. 9, 1870.
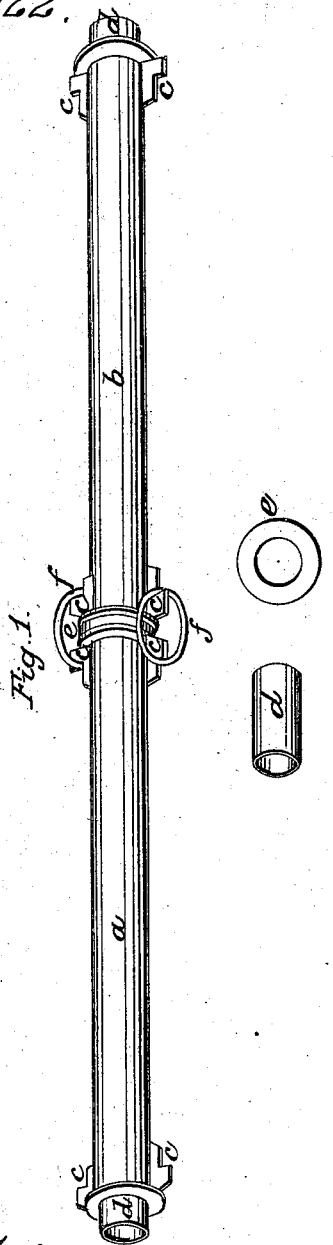
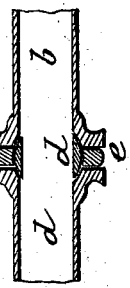
Witnesses:
Jacob R. Shotwell
Randolph Ross
Inventor:
Patrick Clark

United States Patent Office.

PATRICK CLARK, OF RAHWAY, NEW JERSEY.

Letters Patent No. 106,122, dated August 9, 1870.

IMPROVEMENT IN PIPE-JOINTS.

The Schedule referred to in these Letters Patent and making part of the same.

To all whom it may concern:

Be it known that I, PATRICK CLARK, of the city of Rahway, in the county of Union and State of New Jersey, have invented certain Improvements in Joints for Gas, Water, and Steam-Mains; and I do hereby declare that the following is a full and exact description thereof, reference being had to the accompanying drawings and to the letters of reference marked thereon.

The nature of my invention consists in the provision of means for counteracting the effect of expansion and contraction incident to continuous lines of metal pipes, from which loss arises by reason of leakage from the loosened joints.

Flanges and bolts cannot be relied on for tight joints, from the fact that the flanges are broken by the contraction of the pipes.

It is well known that leaded joints become loosened, and cause serious loss from the same cause.

Gas-pipes are subjected to great variations of temperature, from the fact that the gas enters them at very variable degrees of heat, and also that they are exposed to the changes in the temperature of the earth in which they are imbedded.

Figure 1 in the accompanying drawings shows two lengths of pipe connected in a way that counteracts the destructive effects of expansion and contraction on the joints.

The pipes $a$ and $b$ have flanges and catches, $c$, cast or made fast on their ends.

A gland of thin metal, $d$, is inserted into the ends of the pipes.

A collar, $e$, of any elastic substance (gum caoutchouc being preferred) is placed on the gland $d$.

When the pipes are drawn close together, with the elastic collar between them, as above described, a metal link, $f$, is placed on the catches or lugs $c$, either on one or both sides, as may be desired, in such manner as to cause a compression of the elastic collar, the ends of the pipes having been previously coated with linseed or other drying-oil, to make the collar adhere to the pipe.

In Figure 2, a different way of using the elastic collar is shown.

The ends of the pipes may be made so as to receive a round or elliptical gland, to hold the rubber collar, as in fig. 2, and be held together by the metal link $f$, as shown in fig. 1.

One elastic link is sufficient for pipes of four inches diameter, and under.

The mode of laying and connecting these pipes is very simple, and it can be done with great rapidity.

A pipe is laid on the ground at the bottom of the trench; the thin metal gland is inserted in the end; the elastic collar is placed upon the gland; another pipe is then put in connection by inserting the gland in its end, and pressing it close to the first pipe; the free end of the second pipe is then held up until the elastic metal link will catch the projections or lugs on the ends of the pipes; it is then gently lowered to its place at the bottom of the trench, thus tightly compressing the elastic collar between the ends of the pipes.

What I claim as my invention, and desire to secure by Letters Patent, is—

1. The elastic collar $e$, in combination with the elastic metal link $f$, substantially as described.
2. The flanges and lugs $c$ $c$, in combination with the elastic collar $e$ and the elastic metal links $f$.
3. The metal gland $d$, in combination with the elastic collar $e$, and the elastic metal links or ring $f$, and the flanges and lugs $c$ $c$.

PATRICK CLARK.

Witnesses:
JACOB R. SHOTWELL,
RANDOLPH ROSS.